United States Patent
Lewins et al.

(10) Patent No.: US 7,282,080 B2
(45) Date of Patent: Oct. 16, 2007

(54) PROCESS FOR EXTRACTING PLATINUM GROUP METALS

(75) Inventors: John Derek Lewins, Mount Pleasant (AU); Alan Bax, West Perth (AU)

(73) Assignee: PlatTech Pty Ltd, West Perth (AU)

( * ) Notice: Subject to any disclaimer, the term of this patent is extended or adjusted under 35 U.S.C. 154(b) by 48 days.

(21) Appl. No.: 10/961,683

(22) Filed: Oct. 8, 2004

(65) Prior Publication Data
US 2005/0081683 A1  Apr. 21, 2005

Related U.S. Application Data

(62) Division of application No. PCT/AU03/00435, filed on Apr. 11, 2003.

(30) Foreign Application Priority Data
Apr. 11, 2002 (AU) .................... PS1674

(51) Int. Cl.
C22B 11/00 (2006.01)
(52) U.S. Cl. .................................................. 75/744
(58) Field of Classification Search ............ 75/419, 75/421; 423/24
See application file for complete search history.

(56) References Cited

U.S. PATENT DOCUMENTS 4,304,596 A * 12/1981 Makipirtti et al. ............ 423/48
4,431,614 A * 2/1984 Makipirtti et al. ............ 423/29
4,731,114 A   3/1988 Ramadorai et al.

FOREIGN PATENT DOCUMENTS

CA   2204424 A1   3/1997
GB   833 718      4/1960

OTHER PUBLICATIONS

Metals Handbook, Desk Edition, 2nd Edition, ASM 1998, pp. 41 and 45.*
Muir D.M. and Ariti J.; "Studies on the Dissolution of Platinum and Palladium from Low Grade Ores and By-Products"; Fifth AusIMM Extractive Metallurgy Conference, Perth Australia; Oct. 2, 1991-Oct. 4, 1991, pp. 183-189, Australia.
McInnes C.M. et al; "Extraction of Platinum, Palladium and Gold by Cyanidation of Coronation Hill Ore"; Hydrometallurgy, Elsevier Scientific Publishing Cy. Amsterdam, NL; vol. 35, No. 2; Apr. 1, 1994, pp. 141-159.

* cited by examiner

Primary Examiner—Roy King
Assistant Examiner—Kathleen McNelis
(74) Attorney, Agent, or Firm—The Webb Law Firm

(57) ABSTRACT

PGMs can be extracted from a source material by heat-treating the source material to form a residue containing PGMs in a cyanide leachable condition and, thereafter, cyanide leaching the residue using a solution containing cyanide to form a pregnant cyanide leach liquor containing PGMs in solution.

26 Claims, 18 Drawing Sheets

PRIOR ART

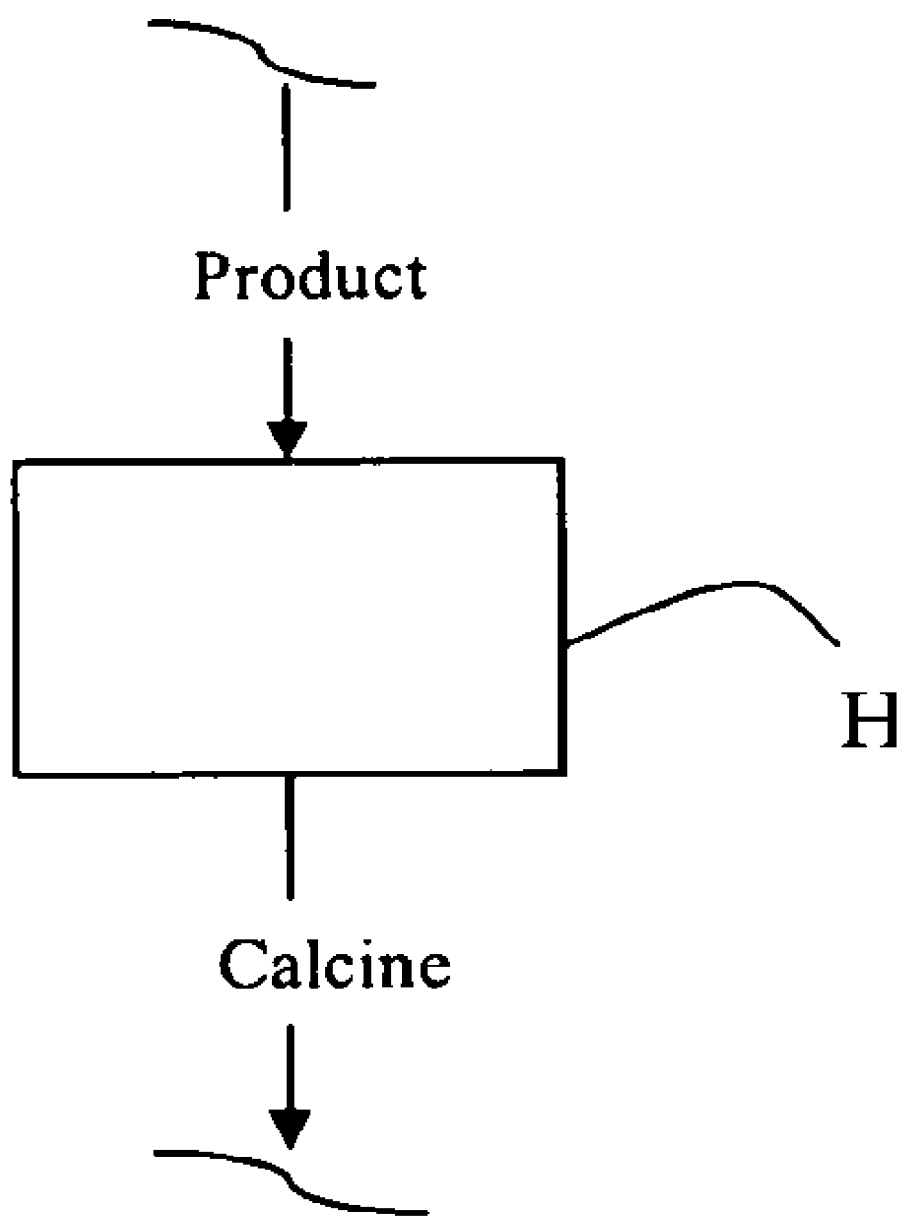

P80 – 53 μm

Calcine – 2 hours various temperatures

Cyanide leach – 60°C, 48 hours, pH 9.5

P80 – 24 μm

Second cyanide leach

P80 – 53 μm

Calcine – 2 hours at 400°C

No Regrind

P80 – 53μm

Calcine – 2 hours at 400°C

Regrind – 33.5μm

P80 – 53μm

Calcine – 2 hours at 400°C

Regrind – 12.8μm

PROCESS FOR EXTRACTING PLATINUM GROUP METALS

CROSS-REFERENCE TO RELATED APPLICATION

This patent application is a divisional of International Patent Application Number PCT/AU03/00435, filed Apr. 11, 2003, and designating inter alia, the United States, which claims priority to Australian Patent Application No. PS 1674, filed Apr. 11, 2002, and which international application is herein incorporated by reference.

FIELD OF THE INVENTION

The present invention relates to a process for extracting platinum group metals (PGMs) from a source material containing PGMs using heat treatment and subsequent leaching with a solution containing cyanide. In this specification, the expression "PGMs" is used to describe metals selected from the group comprising platinum, palladium, rhodium, ruthenium, osmium, iridium and mixtures thereof.

The source material may contain base metals and the present invention also relates to a process for extracting base metals from the source material. In this specification, the expression "base metal" is used to describe metals selected from the group comprising copper, nickel, lead, tin, zinc, cobalt and mixtures thereof.

BACKGROUND OF THE INVENTION

PGMs may occur as discrete minerals or as dilute solid solutions typically in major sulphide minerals (for example, pentlandite, chalcopyrite or pyrrhotite). The separation chemistry of PGMs is amongst the most complex known with treatment being generally more complex as the sulphide or chromitite content of the ore increases. Often, gold is present in minerals rich in PGMs.

Low sulphide PGM ores which contain small amounts of base metal sulphides are typically treated by fine grinding and bulk flotation to give a relatively low-grade PGM concentrate. The flotation reagents used are similar to those typically used for copper and nickel sulphides. The flotation concentrate is then dried before smelting to give a nickel-copper-iron-PGM matte. Smelting is a process by which a metal is separated from its ore in the presence of a reducing agent and a fluxing agent.

The platinum group metals have a greater affinity with sulphide melts than with silicate melts and therefore partition with the matte phase rather than with the slag. The matte is "converted" while molten by blowing air into the matte to oxidise the matte and remove iron and some sulphur. The converter matte is then granulated or allowed to cool slowly so that discrete crystalline phases of nickel sulphide, copper sulphide, and a platinum group metal-containing magnetic phase are formed. This matte is then sent to a base metal refinery where base metals such as copper, nickel and cobalt are removed and recovered by magnetic separation followed by acid leaching, or by direct acid leaching, leaving a high grade PGM concentrate. The high grade PGM concentrate is then sent to a PGM refinery which produces the individual PGM elements in metallic form. This route is expensive and not altogether satisfactory for lower grade sulphide ores.

Medium sulphide ores which contain economic amounts of nickel plus copper (base metals) are typically treated by fine grinding and selective flotation, to give a nickel copper PGM sulphide concentrate. This concentrate is smelted in flash furnaces to give PGM-containing mattes. The mattes are treated in various ways to give nickel and copper metal products plus PGM containing by-products which are sent to a refinery.

High sulphide ores which contain economic amounts of nickel and copper are also typically first treated by fine grinding and selective flotation, with or without magnetic separation, to give separate nickel copper PGM and copper PGM sulphide concentrates. The nickel copper PGM concentrate which is usually low grade is calcined to remove some sulphur and then smelted in reverberatory or flash furnaces as for concentrates from medium sulphide ores.

Such prior art processes may also include gravity concentration in place of or in conjunction with the flotation step. A simplified block diagram of one current process flow sheet is provided in FIG. 1 of the present specification. Recovery of PGMs by gravity methods or by flotation may be difficult for ores with low sulphide mineral content concentration.

Conventional processes suffer from several limitations. Some PGM ores and in particular oxide ores from existing operations cannot be sufficiently upgraded by flotation to produce a concentrate which can be treated by a smelter. The same is often true for high chromitite ores. Power consumption for the total process is high and the smelting process has difficulty in dealing with high chromitite ores, adversely effecting recoveries and costs.

PGM smelting capacity is concentrated in a limited number of countries, particularly South Africa, Canada, USA and Russia. Existing smelters are typically owned by a small number of companies which typically also operate mines associated with the smelters. Moreover, transport of concentrates to the existing smelters is expensive, making projects remote from the existing smelters difficult to establish.

PGM refining capacity is less concentrated than the smelting capacity with numerous independent refineries operating in Europe and Asia in addition to those associated with the operating mines and smelters.

The market for total treatment of PGM concentrates is therefore less competitive than many other metals markets. Smaller projects cannot justify the large capital investment required for a smelter and refinery. There is therefore a need for an improved method for upgrading the PGM concentrates shipped to provide a high grade concentrate which would by-pass the smelter and be able to be shipped direct to a refinery. This would not only decrease the cost of production but increase the competitiveness of the market.

One alternative method to traditional processing that has been suggested in the prior art is selective leaching of PGMs from finely ground ore. There is no accepted solvent system for platinum group metals reported in prior art literature. Bromide, chloride, hydroxide, cyanide, bisulfide, thiosulphate, sulphite, and polysulphide ions and ammonia have all been suggested as suitable ligands for forming complexes with the platinum group metals. However, the stability and low solubility of some of these complexes and their reactivity with gangue minerals in the ore makes some of these ligands unsuitable as lixiviants for platinum group metals.

While PGMs are generally recovered from ores, there is also a significant market for recovery of PGMs from used automobile and other industrial catalysts and from computer and electronics scrap. There remains a need for an improved method of extracting PGMs from source materials other than ores.

It is to be clearly understood that, although prior art techniques are referred to herein, such reference does not constitute an admission that any of these techniques form part of the common general knowledge in the art in Australia or in any other country.

Throughout this specification, including the claims, the words "comprise", "comprises" and "comprising" are used in a non-exclusive sense, except where the context requires otherwise due to express language or necessary implication, ie. in the sense of "including".

SUMMARY OF THE INVENTION

The present invention is based on the realisation that heat-treatment can be used to convert non-soluble PGMs present in a source material into a form which is soluble in a cyanide solution and that subsequent leaching in a solution containing cyanide can dissolve a substantial amount of the heat-treated PGMs.

According to one aspect of the present invention, there is provided a process for extracting at least one PGM from a source material containing one or more PGMs, the process comprising the steps of:
heat-treating the source material whilst agitating to form a residue containing PGMs in a cyanide leachable condition; and
cyanide leaching the residue using a solution containing cyanide- to form a pregnant cyanide leach liquor containing PGMs in solution.

According to a second aspect of the present invention, there is provided a process for extracting at least one PGM from a source material containing one or more PGMs, the process comprising the steps of:
heat-treating the source material whilst agitating to form a residue containing PGMs in a cyanide leachable condition; and
cyanide leaching the residue using a solution containing cyanide to form a pregnant cyanide leach liquor containing PGMs in solution, characterised in that the step of heat-treating is conducted without the addition of an inorganic acid.

Preferably, the step of heat-treating is conducted at a low temperature, for example below 550° C., to break down the material and liberate the PGMs from the material. Whilst it is possible for the heat-treating step to be conducted at high temperatures, for example above 550° C., it is preferred that the heat treatment is conducted below 550° C., more preferably below 500° C. At higher temperatures, the capital and operating expenditure is higher. Furthermore, it is more likely at higher temperatures, particularly in oxidising atmospheres, for the surfaces of the PGMs to become passivated as they are liberated from the source material and thus render the PGMs less susceptible to cyanide leaching. Preferably, the step of heat-treating is conducted at a temperature in the range of approximately 200° C. to 550° C., and more preferably in the range of approximately 275° C. to 500° C. Low temperature heat-treatment may be conducted in an oxidising or reducing atmosphere provided that the resultant residue contains PGMs in a cyanide leachable condition. Low temperature heat treatment in an oxidising atmosphere has been found generally satisfactory. In this specification, the term "calcining" is used to describe the step of heat-treating in an oxidising atmosphere.

Optimum recoveries of PGMs have been found in test work when sulphide bearing minerals including PGMs have been calcined at a temperature in the range of approximately 375° C. to 425° C. prior to cyanide leaching and hence calcination in this temperature range is particularly preferred. It is to be noted however that the particular heat treating conditions selected will be influenced by the precise nature of the source material.

Whilst the step of heat-treating may be conducted in an oxidising atmosphere or a reducing atmosphere at high temperature, it is preferred that high temperature heat treatment is conducted in a reducing atmosphere at a temperature between approximately 550° C. and 1000° C. as a reducing atmosphere has been found to mitigate the problem of passivation of the surface PGMs at high temperature. Alternatively, the step of heat-treating may utilise a combination of oxidising and reducing conditions.

Preferably, the step of cyanide leaching is conducted at a temperature in the range of ambient and approximately 160° C. It is preferred that the temperature does not exceed 80° C. in order to minimise the breakdown of cyanide with increasing temperature. Thus, more preferably, the step of cyanide leaching is conducted at a temperature in the range of ambient to approximately 80° C. PGMs can still be extracted using cyanide leaching at a temperature greater than approximately 80° C., but doing so results in higher consumption of cyanide and thus higher operating costs. Alternatively, the cyanide leaching step may be conducted under pressure at a temperature within the range of approximately 80° C. and 160° C. to increase the rate of metal dissolution and the overall recovery of metals.

The cyanide leaching process can take up to approximately 120 hours or more depending on the type of source material. Preferably, the step of cyanide leaching is performed for 36–48 hours.

Preferably, a source of oxygen is injected during the cyanide leaching under pressure to improve the reaction kinetics.

The process may further comprise the step of repeating the step of cyanide leaching to increase the concentration of PGMs in the cyanide leach liquor.

The source material may also contain at least one base metal. When the source material contains at least one base metal, the process preferably further comprises the step of acid leaching prior to the step of cyanide leaching to form a pregnant acid leach liquor containing at least one base metal in solution. Preferably, the step of acid leaching is conducted at a temperature between ambient and approximately 200° C. and a pressure between atmospheric pressure and approximately 20 bar. More preferably, the step of acid leaching is conducted at a temperature in the range of ambient and 100° C. at atmospheric pressure.

Preferably, the step of acid leaching comprises the step of leaching in an acid selected from the group comprising sulphuric acid, hydrochloric acid, acid chloride or combinations thereof. The particular acid selected will typically depend upon availability at a mine site with sulphuric acid being a common by-product of other metallurgical processes and thus often the most cost-effective acid available. The acid may be added directly as an acid or, in the case of hydrochloric acid, the acid may be generated by the addition of sodium chloride, for example, and sulphuric acid to form the hydrochloric acid.

It is to be noted that for a source material low in base metals, the step of acid leaching may not be required. For source materials containing high concentrations of base metal, the acid leaching step improves the recovery of the base metals and reduces cyanide consumption.

Recovery of base metals from the pregnant acid leach solution may be achieved using any number of conventional processes such as solvent extraction, ion exchange, electrowinning, reduction and precipitation or any combination thereof. Preferably, the process further comprises the step of recovering the at least one base metal from the pregnant acid leach liquor by solvent extraction, followed by electrowinning. An alternative preferred approach is to recover the at least one base metal from the pregnant acid leach liquor by precipitation.

Preferably, the step of acid leaching is conducted at a pH within the range of approximately 0.7 to 4.0. More preferably, the step of acid leaching is conducted at a pH within the range of 1 to 3. More preferably still, the step of acid leaching is conducted at a pH within the range of 1 to 1.5.

Preferably, said step of cyanide leaching is conducted at alkaline pH using a solution containing cyanide. More preferably, the step of cyanide leaching is conducted at a pH within the range of approximately 9 to 12, most preferably 9 to 10. It has been found that keeping the pH within the preferred range of 9 to 10 increases the recovery of PGMs, particularly platinum.

Preferably, the solution containing cyanide has a cyanide concentration less than 5%, more preferably less than 2%, and more preferably less than 1%. Typically the cyanide concentration will be within the range of 0.05% to 0.5% cyanide. Most preferably, the cyanide solution has a cyanide concentration in the range of 0.1% to 0.25% cyanide. Preferably, the solution containing cyanide contains sodium cyanide.

The solution containing cyanide may further comprise lime, caustic soda, peroxide, oxygen, lead nitrate or combinations thereof.

Preferably, the process further comprises the step of crushing and/or grinding the source material prior to the step of heat-treating. Where the source material is an ore, crushing and/or grinding may be used to assist in liberating the PGMs from gangue. The term "gangue" is used in this specification to describe an unwanted substance which typically in a mineral would be one or more siliceous components. Gangue is desirably removed prior to heat-treating so as to reduce the quantity of material to be heat-treated and subjected to subsequent leaching operation(s) to both improve recovery and reduce operating costs.

Preferably, the step of crushing and/or grinding involves crushing and/or grinding the source material to a P80 in the range of 10 to 150 micrometres. The expression "P80" is used in this specification to refer to 80% of the material fed to a sieve of the nominated size passing through that sieve. More preferably, the step of crushing and/or grinding involves crushing and/or grinding to a P80 in the range of 30 to 80 micrometres. More preferably still, the step of crushing and/or grinding involves crushing and/or grinding to a P80 in the range of 30 to 50 micrometres.

Where the source material contains gangue, the process preferably further comprises the step of removing at least a portion of the gangue from the source material prior to the step of heat treating. The step of removing at least a portion of the gangue is preferably a flotation step which produces a flotation concentrate having a concentration of PGMs and/or base metals which is higher than the concentration before flotation.

The flotation step would be conducted under conditions conducive to the separation of the PGM minerals from the gangue. Reagents such as NASH, copper sulphate, SIBX, SNPX, aeropromoters, sodium silicate and frothers might be added to assist in the flotation process. The particular reagents such as collectors and suppressors, as well as other variables such as the pH selected for flotation, would depend on the type and grade of ore and the type of gangue minerals present in the ore.

It will be understood that any number of flotation cells arranged in series or parallel may be used, as indeed any other suitable apparatus or methods for separating ore from gangue, for example gravity concentration using jigging, shaking tables, or Knelson or Falcon concentrators, magnetic separation, optical sorting or electrostatic precipitation.

The flotation concentrate may be subjected to further grinding or milling followed by further stages of flotation and regrinding. The step of crushing and/or grinding the source material preferably occurs prior to the step of removing at least a portion of the gangue.

Preferably, the process further includes the step of grinding the flotation concentrate prior to the step of heat-treating. Preferably, the process further comprises the step of repeating the steps of removing and grinding to further improve the concentration of PGMs and/or base metals in the flotation concentrate prior to the step of heat-treating.

Preferably, the step of heat-treating is conducted in a fluidised bed or rotary kiln furnace. Each of these apparatus promotes agitation of the source material during heat treatment. Although it is preferred that the step of heat-treating be conducted in a fluidised bed or rotary kiln furnace, it is to be understood that other types of heat treatment apparatus may be used depending on availability and provided the apparatus is capable of heat treating the source material to form a residue containing PGMs in a cyanide leachable condition.

Typically, the heat treating step will involve retaining the source material in a rotary kiln furnace under the selected heat treatment conditions for at least one hour. The preferred retention time during the step of heat-treating will be dependent upon a number of variables including the size and type of heat treatment apparatus, the size and type of the source material, and the selected heat treatment conditions.

Preferably, the process further comprises recovering PGMs from the pregnant cyanide leach liquor. The process may further comprise the step of removing solids from the pregnant cyanide leach liquor to form a cyanide leach filtrate. Any suitable means of solid/liquid separation may be employed including filtration, counter current decantation, cyclone separation or a combination thereof.

The process may further comprise the step of recovering PGMs and/or base metals from the cyanide leach filtrate. The recovery step may comprise activated carbon adsorption, solvent extraction, use of ion exchange resins, molecular recognition technology, electrowinning, reduction, precipitation, or a combination thereof.

Preferably, the process further comprises the step of recovering one or more base metals from the cyanide leach filtrate. Preferably, the step of recovering the base metals comprises the step of solvent extraction.

Preferably, the process further comprises the step of recovering the cyanide from the pregnant cyanide leach liquor for re-use in the process. Cyanide may be recovered and recycled to the process using conventional methods such as acidification/volatilisation/recovery (AVR); resin absorption from either slurry or solution; or solvent extraction. Using AVR, a slurry or solution is acidified and the hydrogen cyanide gas produced is removed by volatilisation in a stream of air. Gaseous hydrogen cyanide is then absorbed into an alkaline solution and recycled to the cyanide leaching circuit. Alternatively, cyanide may be recovered by sulphide precipitation during the acidification stage. The precipitated metals are recovered from solution by solid-liquid separation and gaseous hydrogen cyanide is then volatilised from solution and absorbed into an alkaline solution.

Typically, the concentration of PGMs in the source material will be in the range of 1 gram to 1000 grams per tonne and the concentration of PGMs in the flotation concentrate will be in the range of 5 to 1000 grams per tonne.

Preferably, the source material is a PGM ore, a sulphide mineral, a flotation concentrate or a spent catalyst.

BRIEF DESCRIPTION OF THE DRAWINGS

In order to facilitate a better understanding of the nature of the invention, a preferred embodiment of the method for recovering platinum group metals will now be described in detail, by way of example only, with reference to the accompanying drawings, in which:

FIG. 2A illustrates a portion of a flow chart of one embodiment of the method illustrated in FIG. 2;

DETAILED DESCRIPTION OF THE PREFERRED EMBODIMENTS

Figure 1:
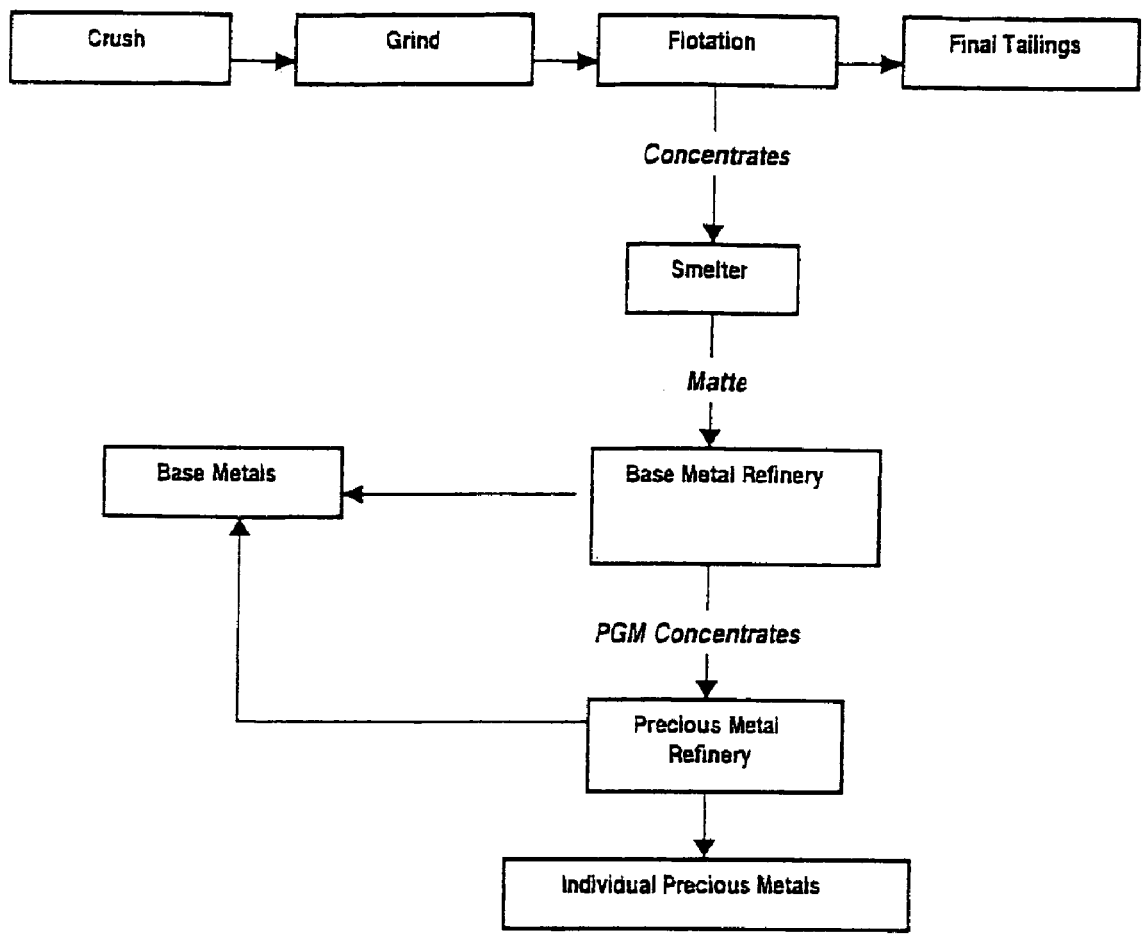
FIG. 1 provides a flow chart showing a prior art method of recovering platinum group metals.
Figure 2:
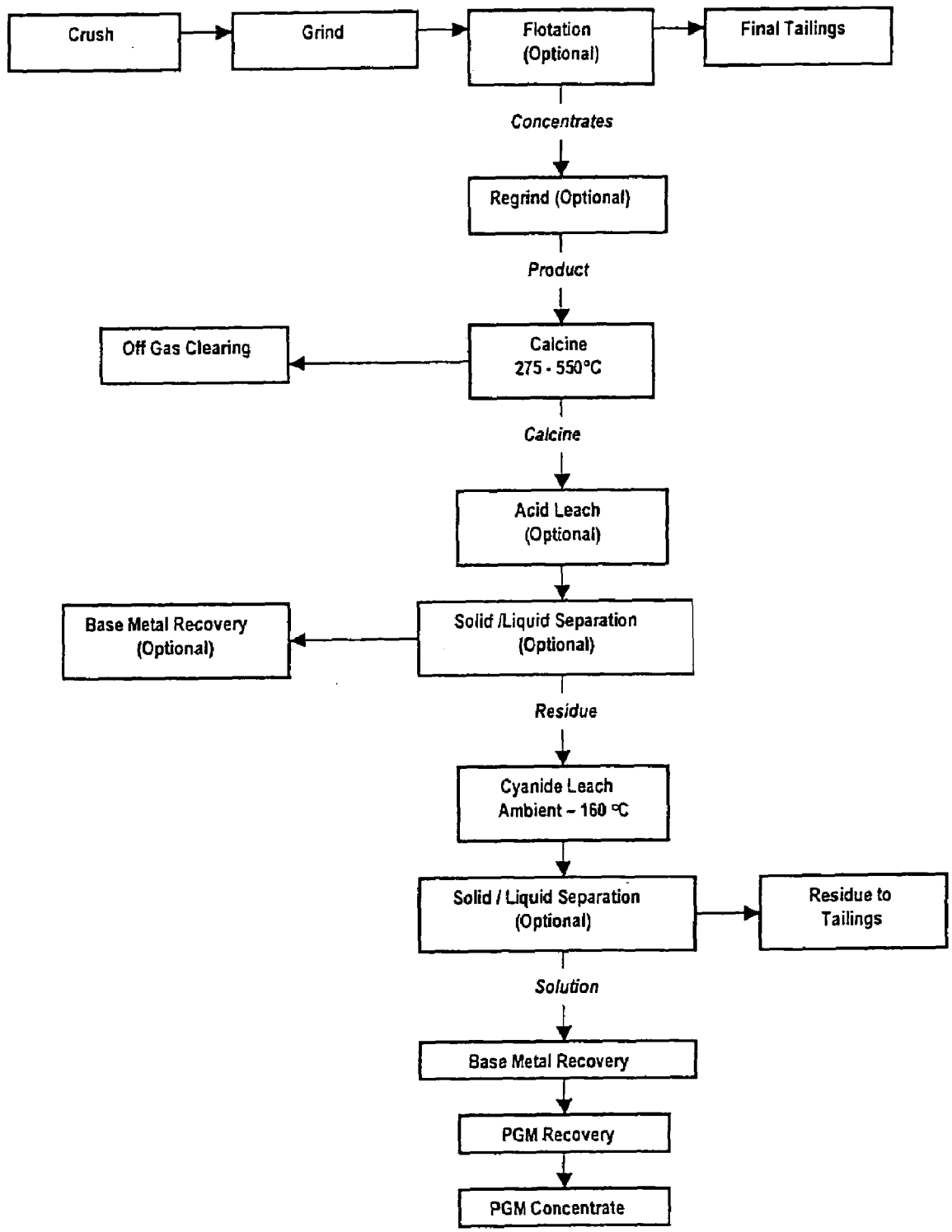
FIG. 2 illustrates a flow chart of a preferred embodiment of the method in accordance with the present invention.

In the following illustrative examples the material treated is a sulphide ore. A typical flowsheet for treating such an ore is illustrated in FIG. 2. FIG. 2 shows a typical flowsheet for processing the ore according to a first embodiment of the present invention. The ore is subjected to crushing and grinding, followed by flotation, to separate a concentrate rich in PGMs and base metals from the gangue which reports to the tailings. The concentrate may be reground and the ground product fed to a suitable heat treatment furnace such as a fluidised bed or rotary kiln furnace (shown at H in FIG. 2A) for calcining in the temperature range of approximately 275° C. to 550° C. The off-gas which may be rich in sulphur dioxide produced during the calcining process would typically be cleaned. The calcine residue may be subjected to an acid leach step if the original ore is sufficiently rich in base metals to warrant an acid leaching step.

Following acid leaching, a solid/liquid separation process is conducted to remove an acid leach liquor rich in base metals. The base metals may then be recovered using any of the existing known processes. The solids removed during the solid-liquid separation stage are then subjected to a cyanide leach at a range of temperatures between ambient and 160° C. Following cyanide leaching, a solid/liquid separation step is conducted again with the residue being sent to tailings and the pregnant filtered cyanide leach liquor being further treated to remove the base metals and/or the PGMs. Following the recovery process, the PGM concentrate is then available for shipping to the end user.

Figure 10:
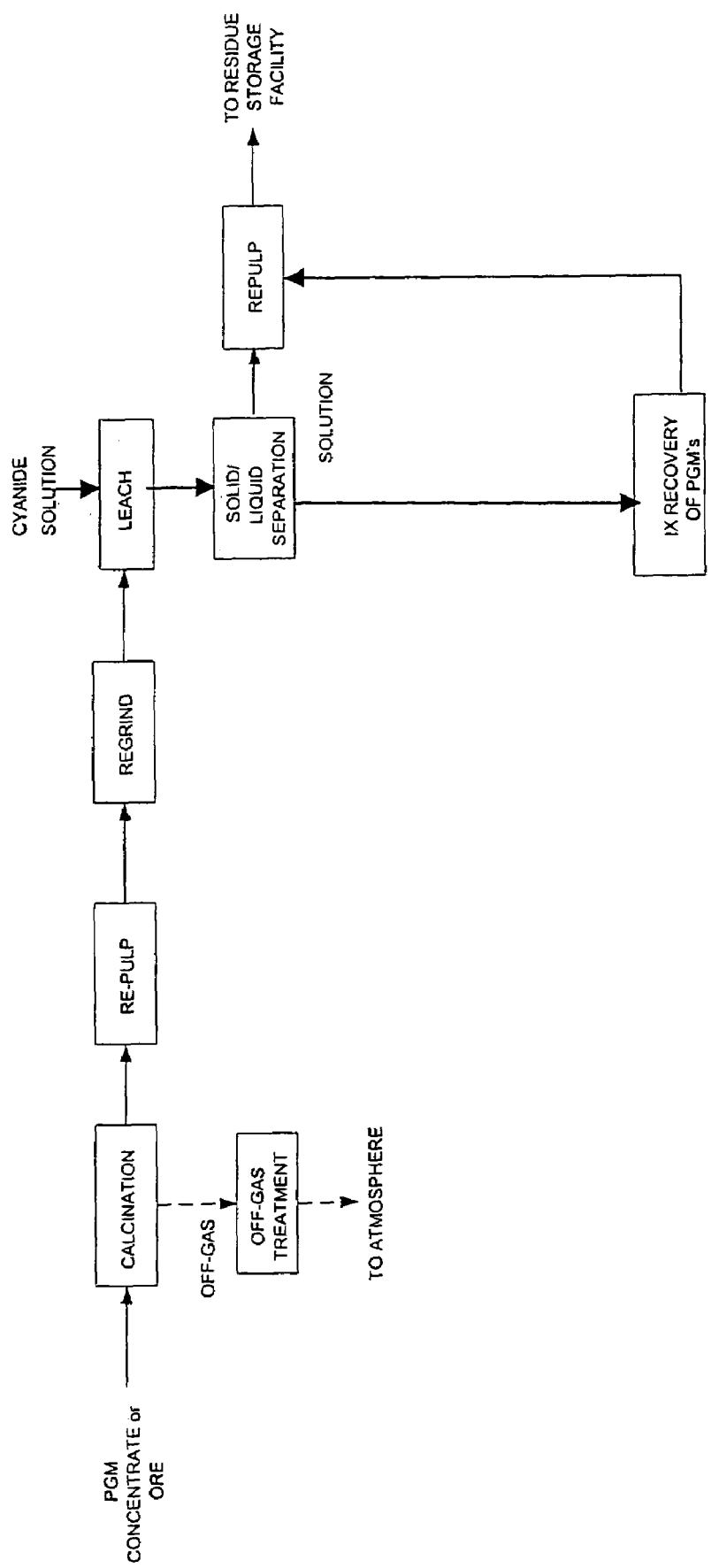
FIG. 10 illustrates graphically a typical flowsheet for a second preferred embodiment of the present invention.

In relation to FIG. 10, a PGM concentrate or an ore containing PGMs is subjected to calcination and the off-gas from the calcination process may be treated using any known process before being vented to atmosphere. Following calcination, the residue is repulped and reground and then subjected to a cyanide leach. After leaching, a solid/liquid separation stage is used to separate solids which are then repulped and sent to a residue storage facility.

Illustrative examples based on test work will now be presented to exemplify the present invention and should not be construed to limit the inventive method in any way. The test work is presented below in a series of tests which have been conducted either on oxidised ore, i.e. the ore that is closer to the surface and may have been oxidised, primary ore, which is the below-surface ore nominally less than 60 metres, as well as whole ore. Throughout the test work the cyanide leach solution is a combination of sodium cyanide, lime, sulphuric acid and lead nitrate with the concentration in each example determined by the percentage of sodium cyanide in the cyanide leach solution.

EXAMPLE 1

Primary Ore Flotation Concentrate Calcine-Leach

Figure 3:
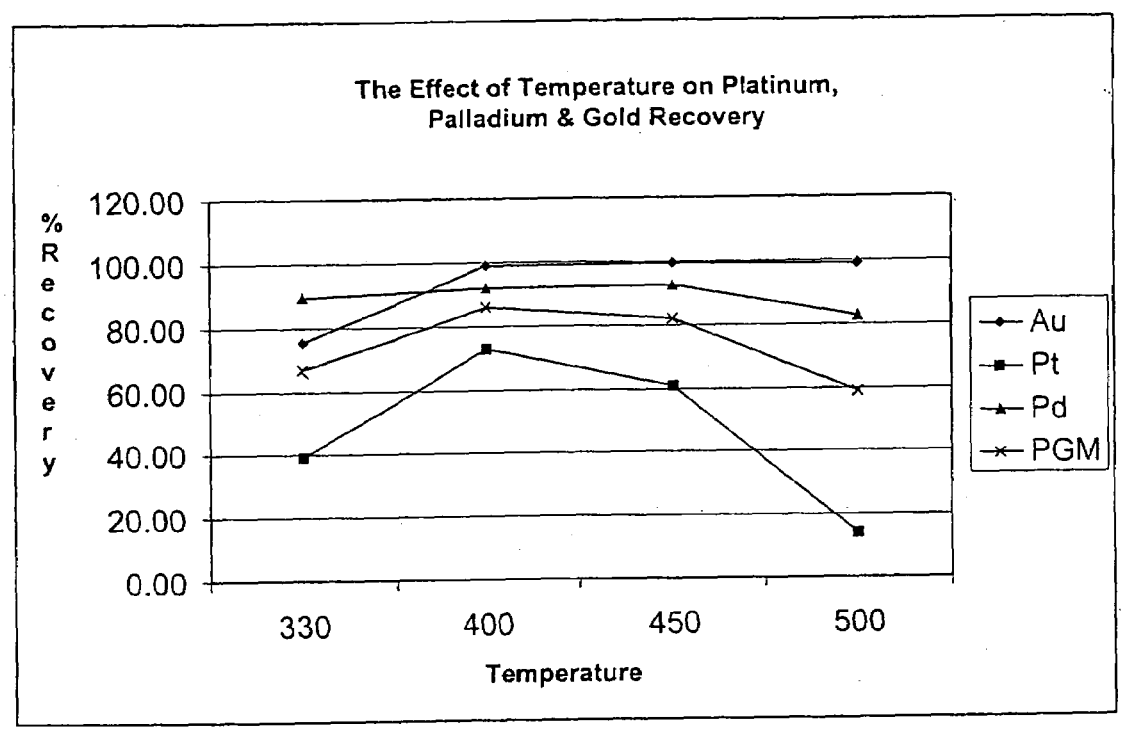
FIG. 3 illustrates graphically the effect of calcine temperature on recovery of Pt+Pd+Au on the primary ore flotation concentrate of Example 1.

In the first series of tests, primary ore flotation concentrate with a nominal P80 feed size of 53 μm was calcined at a series of temperatures, namely 330° C., 400° C., 450° C. and 500° C. for two hours. The calcined ore was then subjected to a cyanide leach at 60° C. for 48 hours at a pH of 9.5. The cyanide leach residue was reground to a P80 of 24 μm and subjected to a second cyanide leach under the same conditions. FIG. 3 shows the effect of calcine temperature on the recovery expressed as the weighted average of Pt plus Pd plus Au. As can be seen clearly from FIG. 3, the best results were obtained for calcining at 400° C. with Pt recovery of 72.7%, Pd recovery of 91.8% and Au recovery of 99% after 48 hours.

The total recovery of Pt, Pd, Au, Ni, Co and Cu are shown in Table 1 below.

TABLE 1

| Element | 330° C. | 400° C. | 450° C. | 500° C. |
| --- | --- | --- | --- | --- |
| Pt | 39.0 | 72.7 | 60.9 | 14.0 |
| Pd | 89.5 | 91.8 | 92.1 | 82.2 |
| Au | 75.3 | 99.0 | 99.5 | 98.8 |
| Ni | 54.9 | 43.8 | 37.2 | 36.0 |
| Cu | 29.7 | 66.1 | 45.6 | 51.3 |
| Co | 20.4 | 20.5 | 12.3 | 12.0 |

EXAMPLE 2

Figure 4:
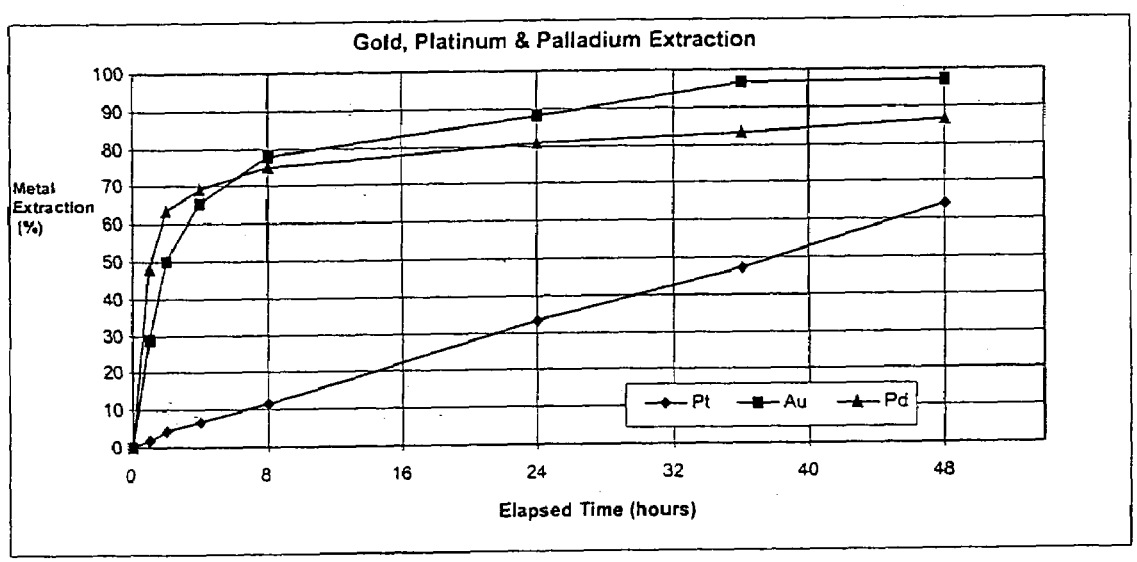
FIG. 4 illustrates graphically the percentage recovery of Pt, Pd and Au over time for primary ore flotation concentrate calcined at 400° C. with no regrind prior to cyanide leaching of Example 2.
Figure 5:
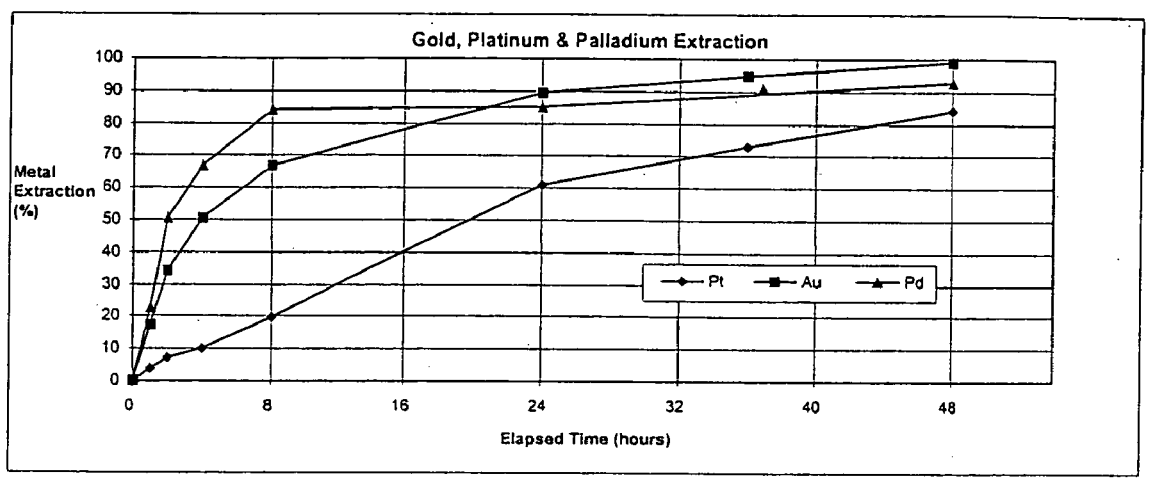
FIG. 5 illustrates graphically the percentage recovery of Pt, Pd and Au over time for primary ore flotation concentrate calcined at 400° C. with a regrind to give a P80 of 33.5 μm of Example 2.
Figure 6:
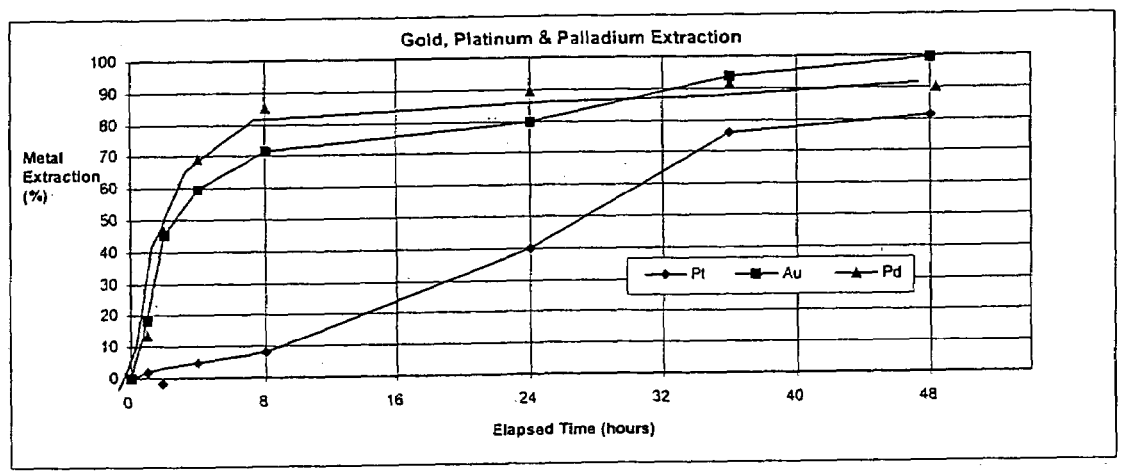
FIG. 6 illustrates graphically recovery as a function of time with a regrind to give a P80 of 12.8 μm of Example 2.

Primary ore flotation concentrate with a P80 size of 53 μm was calcined at a temperature of 400° C. for two hours and the effect of a subsequent regrind prior to cyanide leaching was assessed. Tests were conducted without regrind, with a regrind P80 size of 33.5 μm and a third test with a P80 regrind size of 12.8 μm. Subsequent cyanide leaching was conducted at 60° C. for up to 48 hours at a pH of 9.5 and the results are presented below in Table 2. FIG. 4 illustrates the percentage metal extraction of Au, Pt and Pd as a function of time with no regrind. FIG. 5 illustrates the percentage metal extraction of Au, Pt and Pd as a function of time with a regrind P80 of 33.5 μm. FIG. 6 illustrates the percentage metal extraction of Au, Pt and Pd as a function of time with a regrind P80 of 12.8 μm.

TABLE 2

| Element | No Regrind | Regrind P80 33.5 μm | Regrind P80 12.8 μm |
| --- | --- | --- | --- |
| Pt | 64.1 | 84.3 | 81.4 |
| Pd | 86.6 | 92.9 | 95.3 |
| Au | 97.3 | 99.2 | 99.4 |
| Ni | 47.5 | 50.6 | 64.9 |
| Cu | 77.0 | 79.9 | 81.4 |
| Co | 22.8 | 32.8 | 49.7 |

These figures illustrate that the recovery can be improved with finer grinding prior to cyanide leaching.

EXAMPLE 3

Oxidised Ore Flotation Concentrate Calcine-Leach

Figure 7:
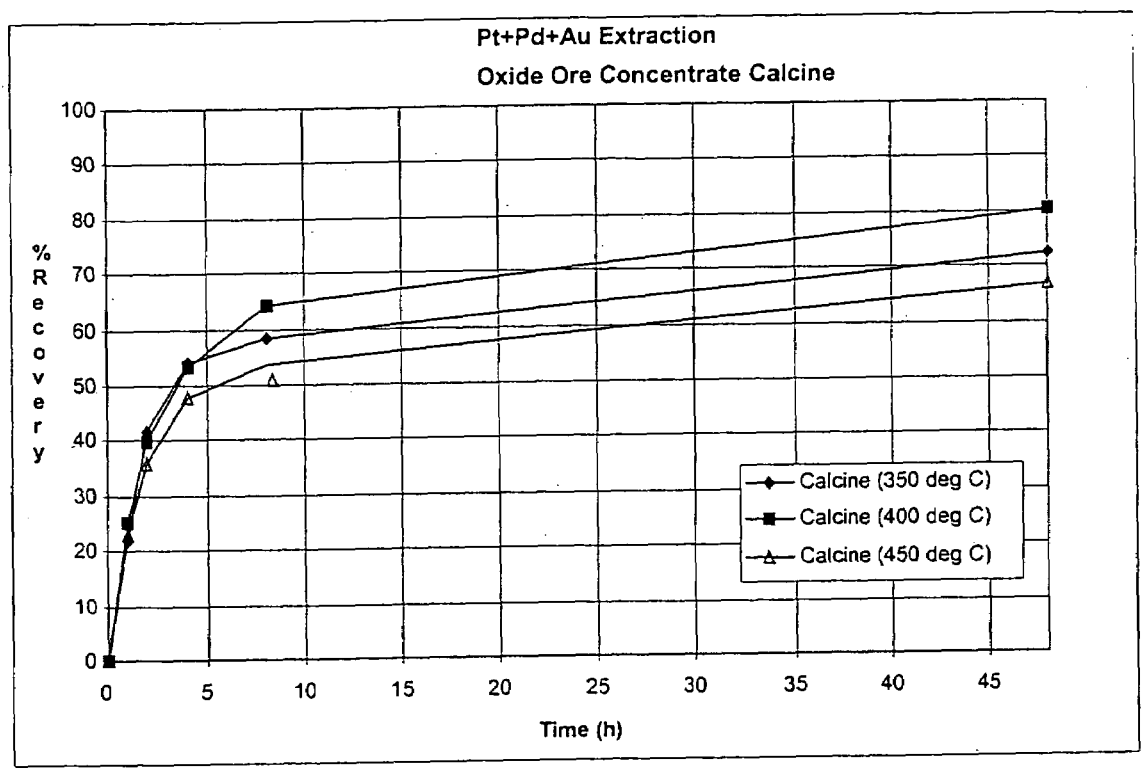
FIG. 7 illustrates graphically the effect of calcining temperature on the recovery of Pt, Pd and Au and the weighted average thereof for Example 3.

Tests were conducted on oxidised ore flotation concentrate subjected to calcining at a range of temperatures followed by cyanide leaching. The oxidised ore had a P80 feed size of 53 μm. Calcining was conducted at 350° C., 400° C. and 450° C. for two hours with a subsequent regrind to bring the P80 size to 20 μm. The samples were then subjected to a cyanide leach at 60° C. for 48 hours at a pH of 9.5 and the recoveries are presented in Table 3 and FIG. 7.

TABLE 3

| Element | 350° C. | 400° C. | 450° C. |
| --- | --- | --- | --- |
| Pt | 45.4 | 64.4 | 46.2 |
| Pd | 85.1 | 83.5 | 71.4 |
| Au | 98.0 | 99.4 | 99.3 |
| Ni | 10.5 | 20.1 | 10.5 |
| Cu | 54.8 | 52.2 | 54.8 |
| Co | 10.9 | 15.5 | 10.9 |

Figure 8:
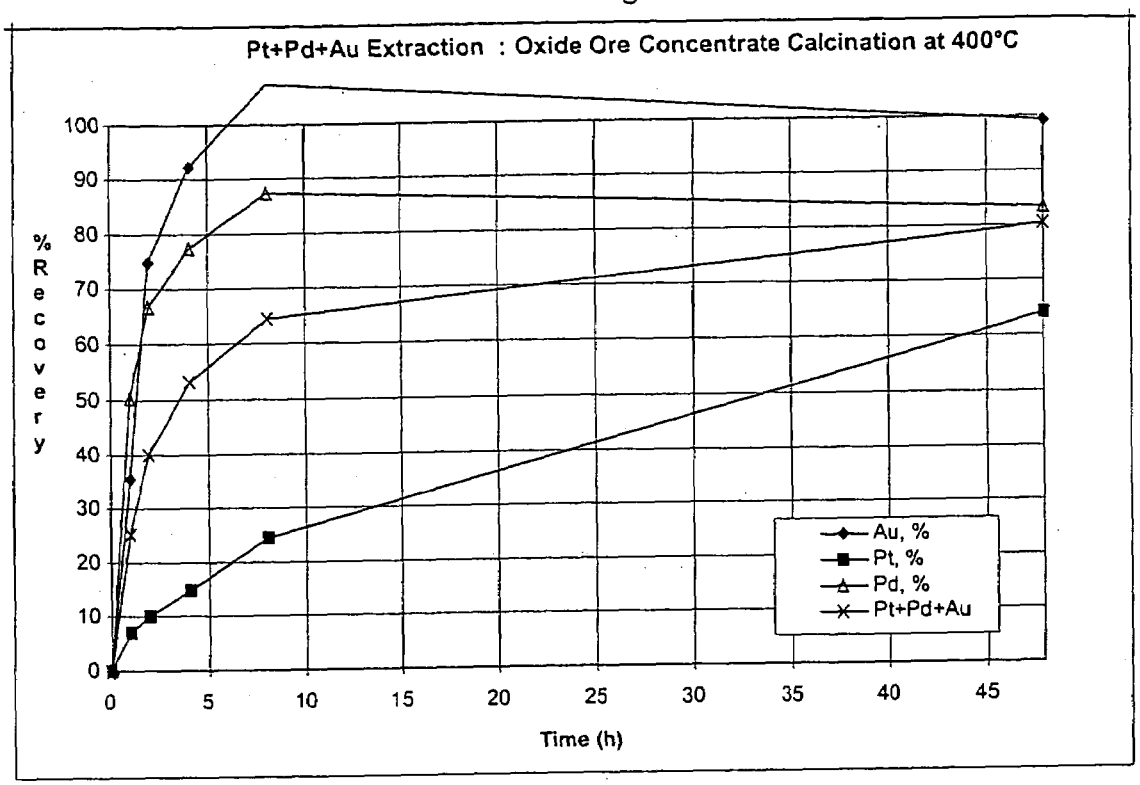
FIG. 8 illustrates graphically the percentage recovery of Pt, Pd and Au over time for a sample calcined at 400° C. for Example 3.

FIG. 8 illustrates the percentage recovery of Au, Pt, Pd and the weighted average of Pt+Pd+Au as a function of time for calcining at a temperature of 400° C.

EXAMPLE 4

Acid Leaching of Calcined Oxidised Ore Flotation Concentrate

Tests were conducted to assess the effect of a subsequent acid leach following calcining at 400° C. An oxidised ore flotation concentrate with a P80 size of 53 μm was subjected to calcining at 400° C. for two hours. A regrind to give a P80 size of 20 μl was conducted on the sample that was not subjected to a subsequent acid leach, but no regrind was conducted on the sample to be acid leached. Acid leaching was conducted at a pH of 1.5 with sulphuric acid at ambient temperature for eight minutes. Both samples were then subjected to a cyanide leach at 60° C. for 48 hours with a pH of 9.5. The results are presented in Table 4 below.

TABLE 4

| Element | 400° C. calcine plus regrind to P80 20 μm | 400° C. roast, no regrind and acid leaching |
| --- | --- | --- |
| Pt | 54.3 | 47.2 |
| Pd | 85.0 | 87.4 |
| Au | 99.3 | 98.9 |
| Ni | 15.0 | 18.2 |
| Cu | 43.3 | 64.4 |
| Co | 11.4 | 44.5 |

The effect of acid leaching is to increase the recoveries of the base metals Ni, Co and Cu without unduly affecting the recovery of Pt and Au. Surprisingly, the Pd recovery has improved following subsequent acid leaching.

EXAMPLE 5

Oxide Ore Calcine Leach Tests for Whole Ore

Tests were conducted on oxide ore with a P80 feed size of 38 μm to assess the effect of calcining temperature being varied between 375° C. and 400° C. Calcining was conducted for two hours with no subsequent regrind or acid leaching. Subsequent cyanide leaching was conducted at 60° C. for 48 hours at a pH of 9.5 with the results presented in the following Table 5.

TABLE 5

| Element | 375° C. | 400° C. |
| --- | --- | --- |
| Pt | 8.2 | 4.9 |
| Pd | 73.6 | 99.5 |
| Au | 98.5 | 66.4 |
| Ni | 31.6 | 7.1 |
| Cu | 35.5 | 35.0 |
| Co | 2.3 | 2.5 |

Figure 9:
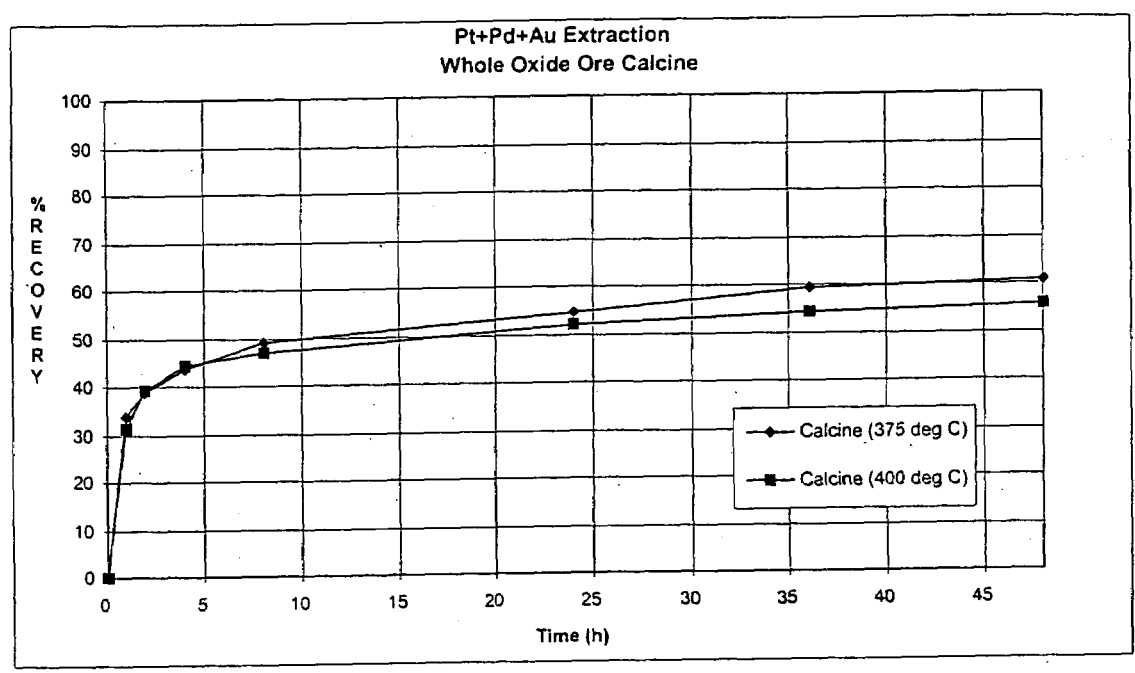
FIG. 9 illustrates graphically the percentage recovery of Pt, Pd and Au over time for a whole of ore sample leached at 375 and 400° C.

FIG. 9 illustrates the percentage recovery as a function of time for the results presented above in Table 5.

EXAMPLE 6

Effect of Leach Temperature

Figure 11:
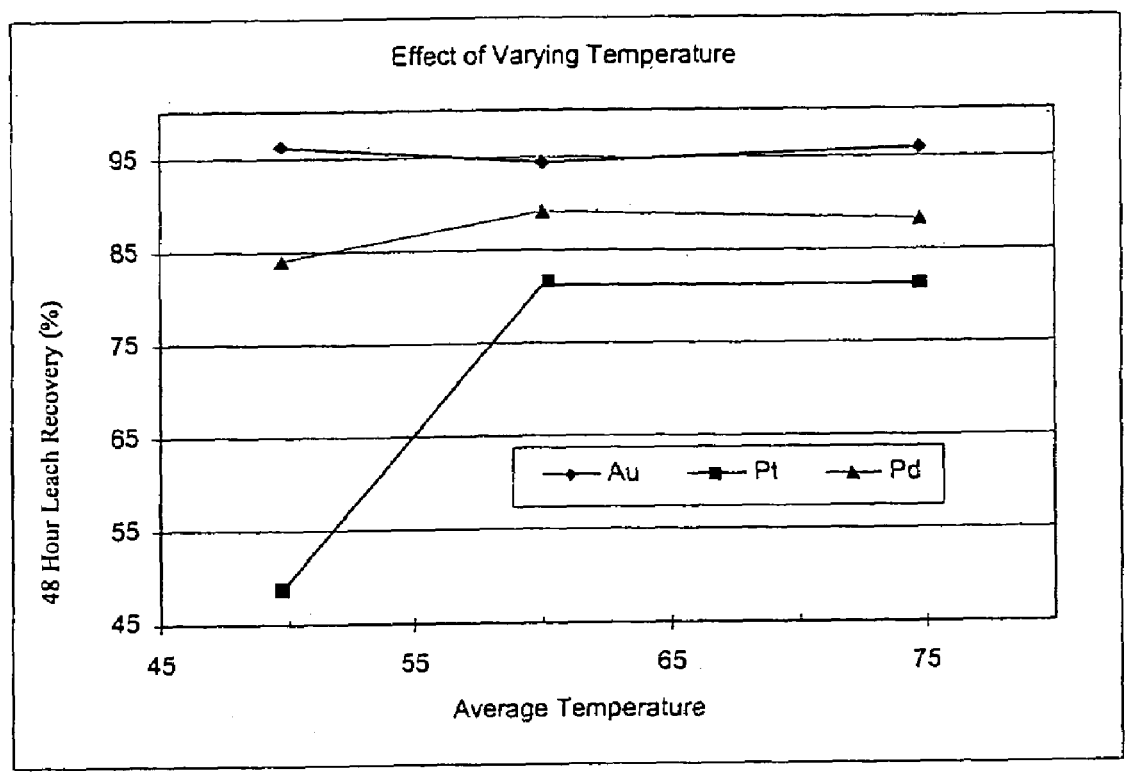
FIG. 11 illustrates graphically the effect of varying temperature on PGM recovery.

The results of tests conducted to evaluate the effect of varying cyanide leach temperature are summarised in Table 6 below and plotted in FIG. 11.

The results indicate that PGM metal recoveries increase up to a cyanide leach temperature of 60° C. and plateau out, slightly decreasing up to 75° C. Base metal recovery varied slightly over the range tested but tended to decrease at higher temperature. 60° C. has thus been selected as the preferred leach temperature.

TABLE 6

Leach Conditions

| Leach Temp °C. | Leach Time, hours | Extraction % | | | | | |
|---|---|---|---|---|---|---|---|
| | | Pt | Pd | Au | PGM | Cu | Ni | Co |
| 50 | 48 | 48.8 | 84.0 | 96.3 | 70.4 | 62.4 | 21.5 | 12.4 |
| 60 | 48 | 81.1 | 89.0 | 94.4 | 86.1 | 59.2 | 23.2 | 17.0 |
| 75 | 48 | 81.1 | 88.1 | 95.8 | 85.7 | 57.8 | 22.1 | 18.1 |

EXAMPLE 7

Cyanide Leach Concentration

A series of leach tests were conducted on ground calcine, at pH 9.5, 60° C. and dissolved oxygen levels of +13 ppm for 48 hours over a range of cyanide solution concentrations.

Figure 12:
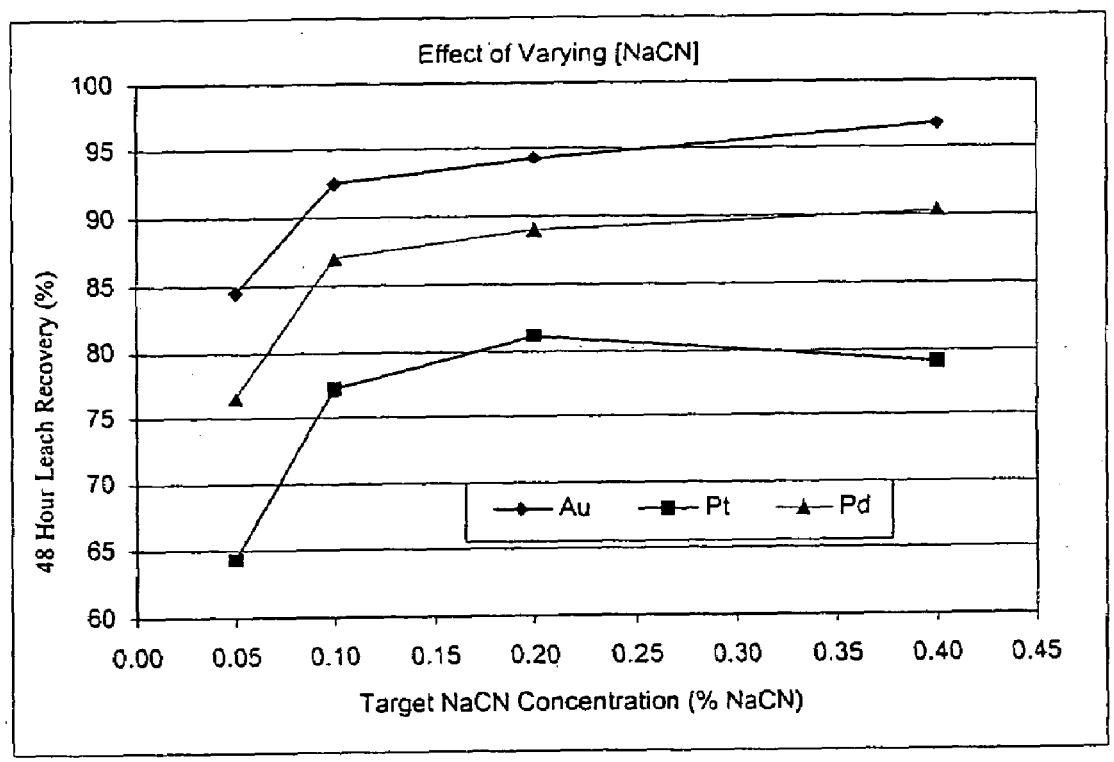
FIG. 12 illustrates graphically the effect of cyanide concentration on PGM recovery.

The results summarised in Table 7 and illustrated in FIG. 12.

TABLE 7

Leach Conditions

| Soln. NaCN | Leach Time, hours | Leach Extraction % | | | | | | |
|---|---|---|---|---|---|---|---|---|
| | | Pt | Pd | Au | PGM | Cu | Ni | Co |
| 0.2% | 48 | 81.1 | 89.0 | 94.4 | 86.1 | 59.2 | 23.2 | 17.0 |
| 0.05% | 48 | 64.4 | 76.5 | 84.4 | 72.2 | 6.5 | 2.6 | 2.8 |
| 0.1% | 48 | 77.2 | 86.9 | 92.6 | 83.3 | 20.7 | 10.4 | 7.3 |
| 0.4% | 48 | 79.0 | 90.3 | 94.8 | 86.3 | 67.3 | 32.4 | 24.0 |

From Table 7 and FIG. 12, it is apparent that 0.2% NaCN concentration produced the highest Pt recovery and Pd and Au recoveries only increased marginally at 0.4% NaCN. Thus 0.2% NaCN concentration was selected as optimum.

Base metal recoveries were slightly higher at the maximum cyanide strength tested. The extra cyanide costs at 0.4% NaCN were not justified by the small additional recoveries.

EXAMPLE 8

Slurry pH with Lime

The effect of pH on metal recoveries was evaluated using lime as pH modifier. The average pH recorded throughout the tests was used as basis of the evaluation.

Figure 13:
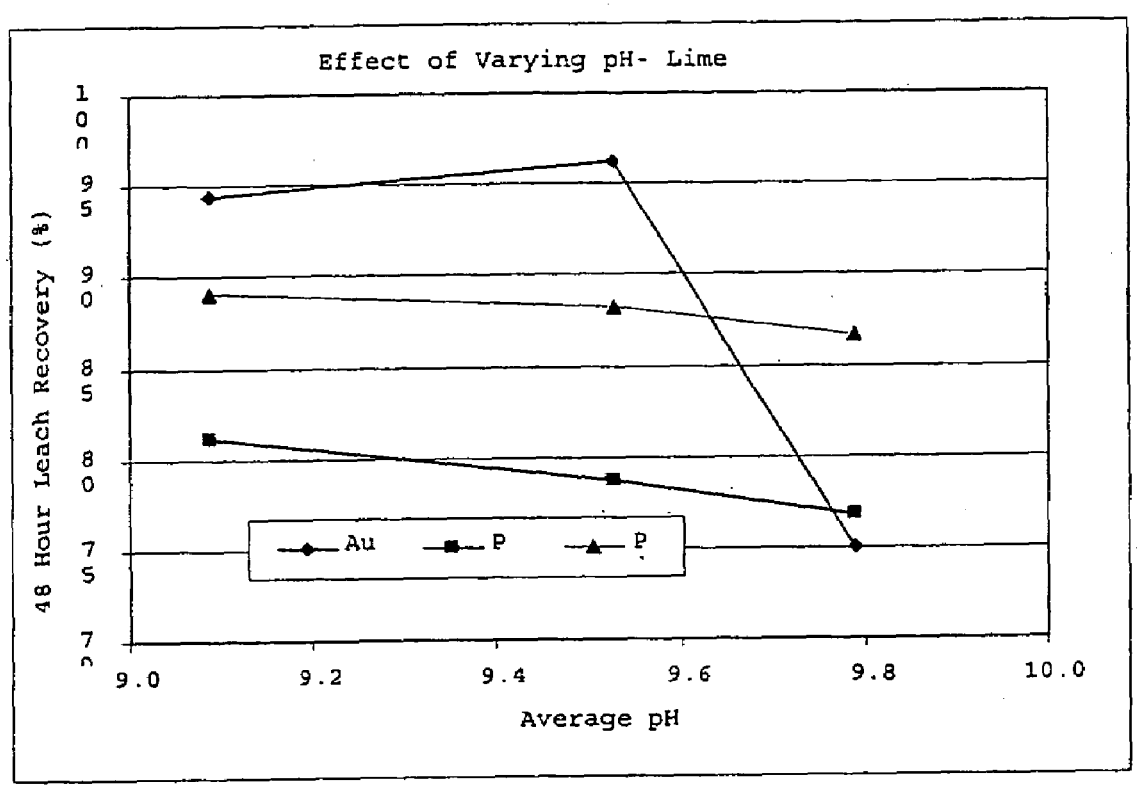
FIG. 13 illustrates graphically the effect of varying pH using lime on PGM recovery.

The results are summarised in Table 8 and plotted in FIG. 13.

TABLE 8

Leach Conditions

| PH | Leach Time, hours | Leach Extraction % | | | | | | |
|---|---|---|---|---|---|---|---|---|
| | | Pt | Pd | Au | PGM | Cu | Ni | Co |
| 9.1 | 48 | 81.1 | 89.0 | 94.4 | 86.1 | 59.2 | 23.2 | 17.0 |
| 9.5 | 48 | 78.8 | 88.2 | 96.2 | 84.9 | 58.6 | 22.4 | 12.7 |
| 9.8 | 48 | 76.8 | 86.6 | 75.0 | 81.1 | 55.4 | 20.7 | 12.6 |

In the pH range tested the results indicate that pH of 9.1 is optimum for Pt and Pd and Au recovery is optimum at pH 9.5 but only marginally lower at pH 9.2. Base metal recoveries were greatest at the lowest pH tested.

EXAMPLE 9

Slurry pH with NaOH

Figure 14:
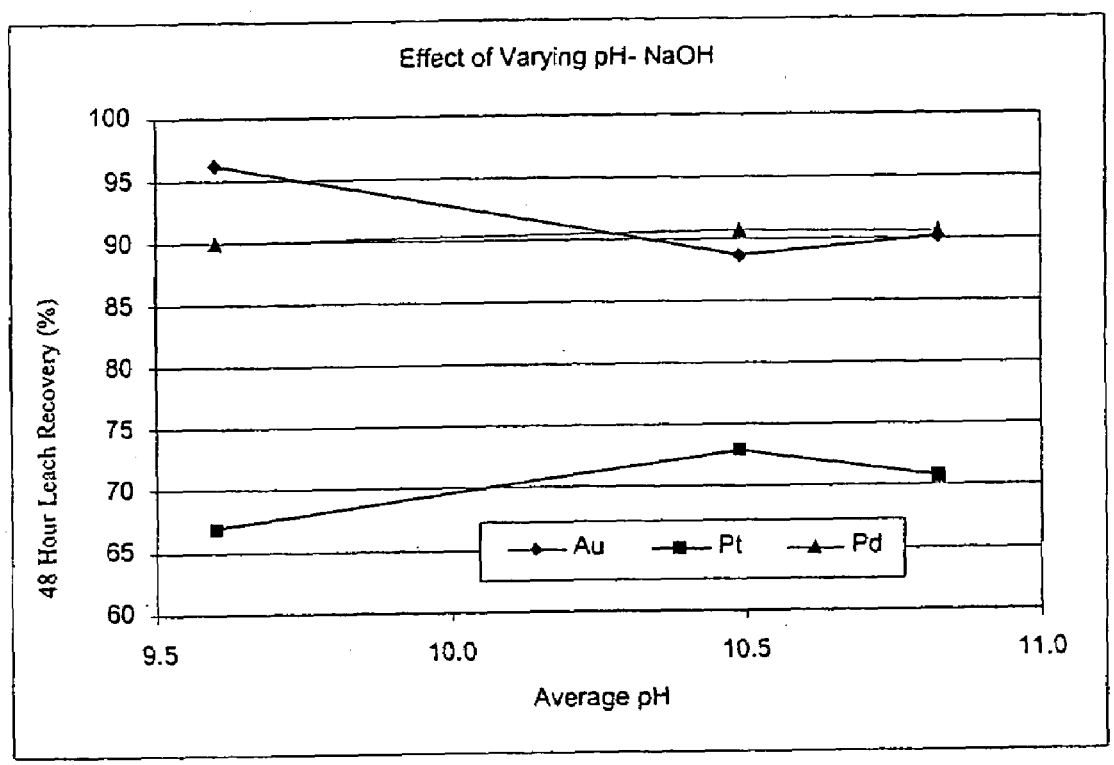
FIG. 14 illustrates graphically the effect of varying pH using NaOH on PGM leach extraction.

The effect of pH, on metal recoveries was evaluated using caustic soda as pH modifier. The average pH recorded throughout the tests was used for comparison. The results are summarised in Table 9 and plotted in FIG. 14.

TABLE 9

Leach Conditions

| pH Modifier | pH | Leach Time, hours | Leach Extraction % | | | | | | |
|---|---|---|---|---|---|---|---|---|---|
| | | | Pt | Pd | Au | PGM | Cu | Ni | Co |
| Lime | 9.1 | 48 | 81.1 | 89.0 | 94.4 | 86.1 | 59.2 | 23.2 | 17.0 |
| 5.6 kg/t NaOH | 9.6 | 48 | 66.8 | 90.0 | 96.1 | 80.6 | 58.3 | 22.9 | 15.0 |
| 8.2 kg/t NaOH | 10.5 | 48 | 73.0 | 90.7 | 88.7 | 83.1 | 53.7 | 20.6 | 14.8 |
| 10.8 kg/t NaOH | 10.8 | 48 | 70.7 | 90.5 | 90.1 | 82.0 | 52.9 | 19.9 | 15.7 |

In the pH range tested the results indicate that Pt recovery is optimum at 10.5, Au at pH 9.6 and Pd at 10.5. The best Pt recovery with caustic soda, however, is 8% less than achieved with lime. The best Pd and Au recoveries achieved with caustic soda are 90.7% and 96.1% compared to 89.0% and 96.2% achieved with lime. Lime produced higher base metal recoveries than caustic soda.

Lime was thus determined to be the preferred pH modifier.

EXAMPLE 10

Level of Dissolved Oxygen in Leach Slurry

Figure 15:
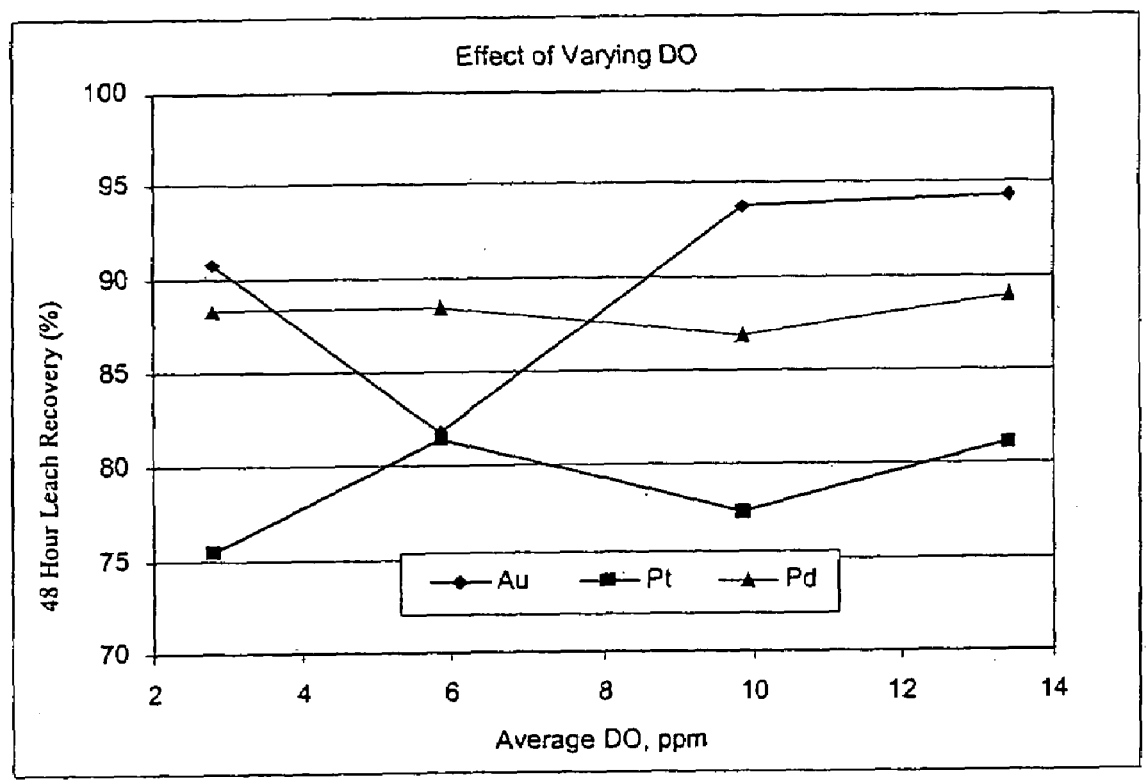
FIG. 15 illustrates graphically the effect of varying slurry dissolved oxygen levels on PGM recovery.

The concentration of dissolved oxygen (DO) in the leach slurry was varied by adjusting the feed rate of oxygen or air into the head space of the sealed leach tank. The effect of varying DO levels on metal recovery is summarised in Table 10 and the results plotted in FIG. 15.

TABLE 10

Effect of Varying Slurry DO Level on PE Leach Extraction

| | Leach Conditions | | Leach Extraction % | | | | | | |
|---|---|---|---|---|---|---|---|---|---|
| Oxygenation | Average DO ppm | Leach Time, hours | Pt | Pd | Au | PGM | Cu | Ni | Co |
| Standard | 13.4 | 48 | 81.1 | 89.0 | 94.4 | 86.1 | 59.2 | 23.2 | 17.0 |
| DO at 5 ppm | 5.9 | 48 | 81.4 | 88.5 | 81.8 | 84.8 | 58.1 | 23.4 | 15.5 |
| DO at 10 ppm | 9.9 | 48 | 77.5 | 86.9 | 93.8 | 83.4 | 56.3 | 21.9 | 15.6 |
| Air atmosphere | 2.8 | 48 | 75.4 | 88.3 | 90.8 | 83.1 | 57.2 | 22.4 | 12.6 |

The results indicate that Pt recovery was optimum and stable over the DO range 6 to 13 ppm, and Pd and Au recoveries were optimum in the range 10 to 13 ppm. Base metal recoveries were similarly optimum over the DO range of 6 to 13 ppm.

A DO level of 10 ppm was selected as optimum overall.

EXAMPLE 11

Use of Lead Nitrate

Figure 16:
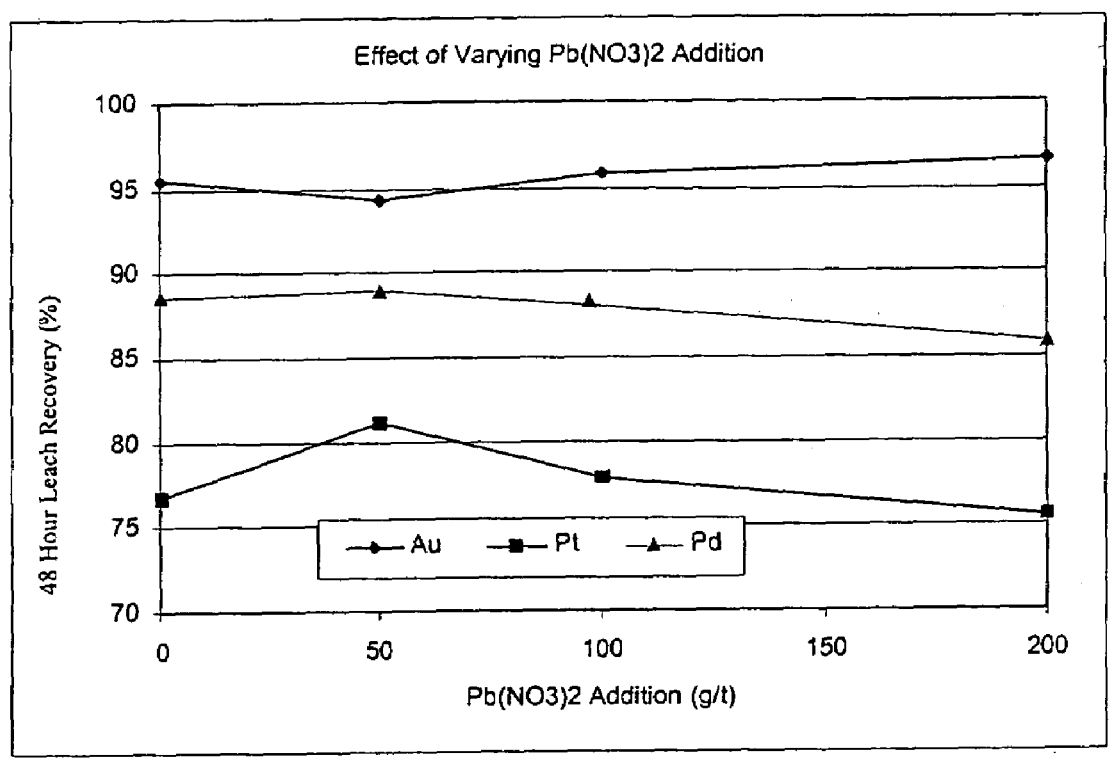
FIG. 16 illustrates graphically the effect of varying (Pb(NO$_3$)$_2$) addition on PGM recovery; and, FIG. 17 illustrates graphically the effect of pulp density on PGM recovery.

The effect of lead nitrate on metal recovery is summarised in Table 11 and the results plotted in FIG. 16.

TABLE 11

| | Leach Conditions | | Extraction % | | | | | | |
|---|---|---|---|---|---|---|---|---|---|
| Notes | Average DO ppm | Leach Time, hours | Pt | Pd | Au | PGM | Cu | Ni | Co |
| 50 g/t Pb(NO3)2 | 13.4 | 48 | 81.1 | 89.0 | 94.4 | 86.1 | 59.2 | 23.2 | 17.0 |
| 0 g/t Pb(NO3)2 | 15.8 | 48 | 76.7 | 88.6 | 95.5 | 84.1 | 58.8 | 23.0 | 14.1 |
| 50 g/t Pb(NO3)2 | 16.6 | 48 | 80.1 | 86.6 | 95.9 | 84.6 | 59.3 | 23.4 | 15.4 |
| 100 g/t Pb(NO3)2 | 14.6 | 48 | 77.8 | 88.1 | 95.8 | 84.3 | 59.2 | 23.2 | 13.7 |
| 200 g/t Pb(NO3)2 | 15.4 | 48 | 75.6 | 85.8 | 96.6 | 82.2 | 61.7 | 23.9 | 15.6 |

The results indicate that Pt and Pd recovery peaked in the 0 to 50 g/t lead nitrate addition rate range and Au recovery increased above this addition rate. The total PGM recovery is within 0.5% over the 0 to 100 g/t lead nitrate addition rate and decreases at greater addition rates. No specific trends in base metal recoveries were observed with different lead nitrate addition rates. Given the operating costs of the lead nitrate and minimal indicated recovery gain the use of the reagent is not justified in this example.

EXAMPLE 12

Acid Leach Tests

The acid leach tests were conducted on concentrates after calcining in a Midrex rotary kiln at 400° C. The tests were done to see what effect the calcining would have on base metal recovery following leaching with sulphuric acid. The results as presented in Table 12 demonstrate reasonably low base metal recovery, particularly nickel.

TABLE 12

| Feed Material | | Calcine Conditions | | | Leach Conditions | | | Leach Extraction % | | |
|---|---|---|---|---|---|---|---|---|---|---|
| Grind P80 | Float ref | Calcine Temp ° C. | Furnace | Calcine time h | Leach Temp ° C. | Solution pH | Leach Time h | Cu | Ni | Co |
| — | Concentrate 1 | 400 | Rotary | 2 | 25 | 1.5 | 8 | 57.1 | 12.1 | 43.1 |
| 38 μm | Concentrate 2 | 400 | Rotary | 2 | 60 | 1.6 | 4 | 61.5 | 25.2 | 63.8 |

EXAMPLE 13

Acid Leaching

A series of tests were conducted as acid ($H_2SO_4$ and HCl) leaches on concentrates in order to evaluate the potential for base metal recovery prior to calcination and the effect of the acid leach on the downstream calcining and PGM leaching and recovery. Tests were conducted on $H_2SO_4$ leaches at pH 1.5 and the tails dried and fed to calcining/cyanide leach tests. Base metal recoveries were generally poor with copper, nickel and cobalt recoveries in the ranges, 32 to 44%, 9 to 13% and 13%, respectively. The results are summarised in Table 13.

Tests also investigated hydrochloric acid leaches, following calcination in the presence of sodium chloride. The base metal extractions in the acid leach were very low, with copper, nickel and cobalt all yielding less than 10% recovery. The results are also summarised in Table 13.

Tests were also conducted to evaluate sulphuric acid leaching of calcines produced in the Midrex rotating kiln with 2 hours calcining times. The base metal extractions were disappointing, with the highest recoveries being 61.5% and 63.8% for copper and cobalt, respectively. The results of these tests are also summarised in Table 13.

TABLE 14

Effect of Pulp Density on PGM Leach Extraction

| Slurry Density | Leach Conditions | | Leach Extraction % | | | | | | |
|---|---|---|---|---|---|---|---|---|---|
| | PH | Leach Time, hours | Pt | Pd | Au | PGM | Cu | Ni | Co |
| 45% w/w | 9.1 | 48 | 81.1 | 89.0 | 94.4 | 86.1 | 59.2 | 23.2 | 17.0 |
| 40% w/w | 9.2 | 48 | 80.7 | 91.3 | 97.6 | 87.2 | 63.3 | 24.5 | 16.6 |
| 50% w/w | 9.1 | 48 | 79.5 | 88.0 | 94.0 | 85.0 | 45.5 | 18.6 | 12.8 |

The results indicate an optimum Pt recovery at 45% solids and very minor decline in Pd and Au recoveries with increasing density. Base metal recoveries, particularly Cu, were generally best at the lowest pulp density. Evaluation of slurry density on leach tank costs, cyanide costs and down stream benefits from higher tenor solutions indicates that 50% solids is the preferable slurry density to be used.

Now that preferred embodiments of the method of extracting PGMs in accordance with the present invention has been described in detail, it will be apparent that it provides a number of significant advantages, including the following:

TABLE 13

| | Leach Conditions | | | | Leach Extraction % | | | Leach Reagents | |
|---|---|---|---|---|---|---|---|---|---|
| Notes | Calcine Grind $P_{80}$ | Leach Temp ° C. | PH | Leach Time, hours | Cu | Ni | Co | $H_2SO_4$ kg/t added | HCl kg/t added |
| Acid leach tails feed to test H3694 | No Calcination | amb | 1.5 | 4 | 32.7 | 13.1 | 13.2 | 258 | |
| Tails not cyanide leached | No Calcination | 45 | 1.5 | 4 | No base metal assays | | | 279 | |
| Tails not cyanide leached | No Calcination | 60 | 1.5 | 4 | No base metal assays | | | 345 | |
| Acid leach tails feed to test H3696 | No Calcination | 60 | 1.5 | 4 | 44.7 | 9.2 | 12.7 | 152 | |
| 100 g NaCl to calcination feed | 36 μm | 60 | 1.5 | 48 | 0.11 | 5.41 | 5.8 | | 336 |
| 50 g NaCl to calcination feed | 36 μm | 60 | 1.5 | 48 | 0.35 | 9.04 | 6.3 | | 297 |
| 148.4 kg/t H2SO4 | — | 25 | 1.5 | 8 | 57.1 | 12.1 | 43.1 | 148 | |
| 217.3 kg/t H2SO4 | 38 μm | 60 | 1.6 | 4 | 61.5 | 25.2 | 63.8 | 217 | |

EXAMPLE 14

Leach Slurry Density

Figure 17:
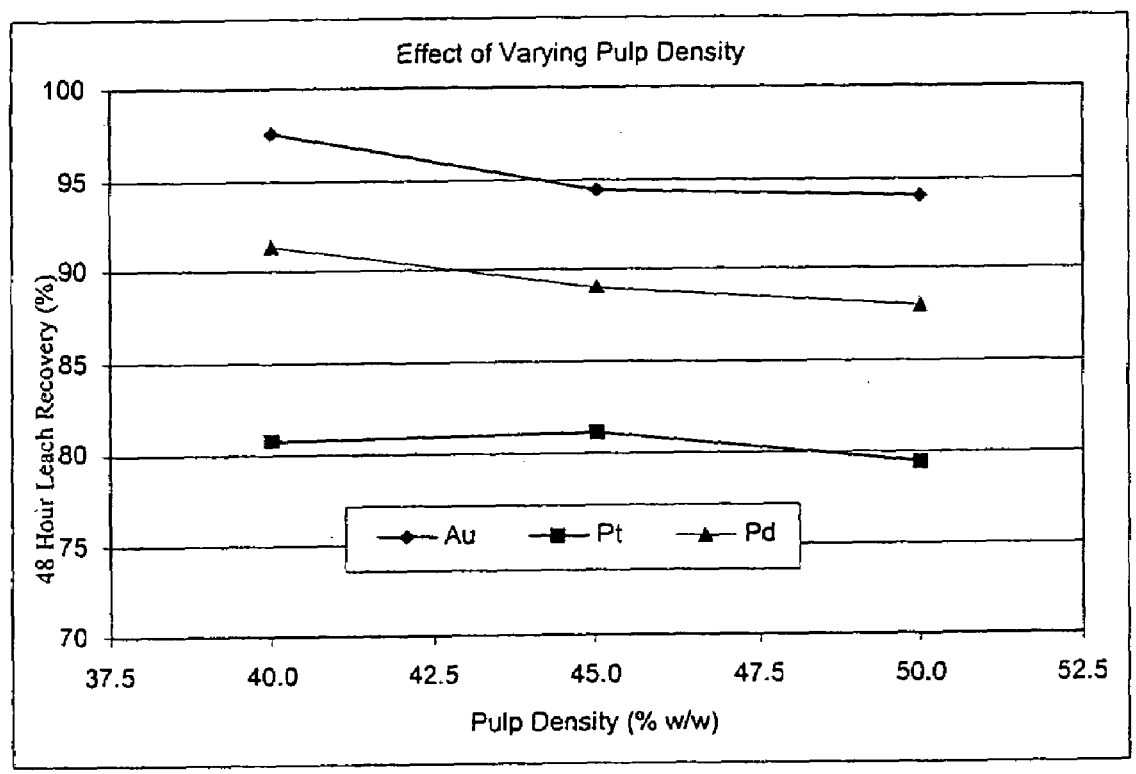

A series of leach tests were conducted using standard conditions at different slurry densities. The results are summarised in Table 14 and plotted in FIG. 17.

a) the ability to treat oxide ores which could not be treated by the traditional process routes.

b) the ability to treat high chromitite ores which could not be treated by the traditional process routes.

c) production of a PGM concentrate which can be sold direct to a refinery, providing a reduction in transport costs; higher payable metal; larger market for the product providing more competitive price; reduced time between shipping concentrate and receiving payment; reduced power consumption and lower total cost of production.

d) the ability to develop operations without the need to construct a smelter or incur significant expenses in shipping concentrates.

Numerous variations and modifications will suggest themselves to persons skilled in the metallurgical engineering arts, in addition to those already described, without departing from the basic inventive concepts. For example, multiple stages of cyanide leaching may be conducted to improve recovery of PGMs and/or base metals. All such variations and modifications are to be considered within the scope of the present invention, the nature of which is to be determined from the foregoing description and the appended claims.

The invention claimed is:

1. A process for extracting at least one PGM from a source material containing one or more PGMs selected from the group consisting of Pt, Pd, Rh, Ru, Os and Ir, the process comprising the steps of:
   heat-treating and agitating the source material to form a residue containing PGMs in a cyanide leachable condition; and
   cyanide leaching the residue using a solution containing cyanide to form a pregnant cyanide leach liquor containing PGMs in solution.

2. The process as claimed in claim 1, further comprising the step of repeating the cyanide leaching to increase the concentration of PGMs in the cyanide leach liquor.

3. The process as claimed in claim 1, wherein the heat-treating is conducted at a temperature in the range of approximately 200 to 550° C.

4. The process as claimed in claim 3, wherein the heat-treating is conducted at a temperature in the range of approximately 275° C. to 500° C.

5. The process as claimed in claim 4, wherein the heat-treating is conducted at a temperature in the range of approximately 375° C. to 425° C.

6. The process as claimed in claim 4, wherein the heat-treating is conducted in an oxidising atmosphere.

7. The process as claimed in claim 1, wherein the heat-treating is conducted in a reducing atmosphere at a temperature between approximately 550° C. and 1000° C.

8. The process as claimed in claim 1, wherein the heat-treating is conducted in a combination of an oxidising atmosphere and a reducing atmosphere.

9. The process as claimed in claim 1, wherein the cyanide leaching is conducted at a temperature in the range of ambient and approximately 160° C.

10. The process as claimed in claim 9, wherein the cyanide leaching is conducted at a temperature in the range of ambient and approximately 80° C. under atmospheric pressure.

11. The process as claimed in claim 9, wherein the cyanide leaching is conducted at a temperature in the range of approximately 80° C. and 160° C. at a pressure of up to 20 bars.

12. The process as claimed in claim 1, wherein the cyanide leaching is conducted for up to approximately 120 hours.

13. The process as claimed in claim 1, further comprising injecting a source of oxygen during the cyanide leaching.

14. The process as claimed in claim 1, wherein the source material also contains at least one base metal.

15. The process as claimed in claim 14, wherein the acid leaching is conducted at a temperature between ambient and approximately 200° C. and a pressure between atmospheric pressure and approximately 20 bar.

16. The process as claimed in claim 15, wherein the acid leaching is conducted at a temperature in the range of ambient and approximately 100° C. at atmospheric pressure.

17. The process as claimed in claim 14, further comprising recovering base metal from the pregnant acid leach liquor.

18. The process as claimed in claim 1, wherein the cyanide leaching is conducted at a pH within the range of approximately 9 to 12.

19. The process as claimed in claim 1, wherein the solution containing cyanide contains sodium cyanide and has a cyanide concentration of less than 5% cyanide.

20. The process as claimed in claim 1, wherein the solution containing cyanide further comprises lime, caustic soda, peroxide, oxygen, lead nitrate, their derivatives or combinations thereof.

21. The process as claimed in claim 1, further comprising at least one of crushing and grinding the source material prior to the heat-treating.

22. The process as claimed in claim 1, wherein the source material contains gangue.

23. The process as claimed in claim 1, wherein the heat-treating is conducted in a fluidised bed or rotary kiln furnace.

24. A process for extracting at least one PGM from a source material containing one or more-PGMs selected from the group consisting of Pt, Pd, Rh, Ru, Os and Ir, the process comprising the steps of:
   heat-treating the source material in the absence of an inorganic acid to form a residue containing PGMs in a cyanide leachable condition; and
   cyanide leaching the residue using a solution containing cyanide to form a pregnant cyanide leach liquor containing PGMs in solution.

25. The process as claimed in claim 14, further comprising acid leaching prior to the cyanide leaching to form a pregnant acid leach liquor containing at least, one base metal in solution.

26. The process as claimed in claim 22, further comprising removing at least a portion of the gangue from the source material prior to heat-treating.

* * * * *